Nov. 11, 1930.  H. J. SCHMICK  1,781,083
POWER DRIVING UNIT
Filed Oct. 5, 1929
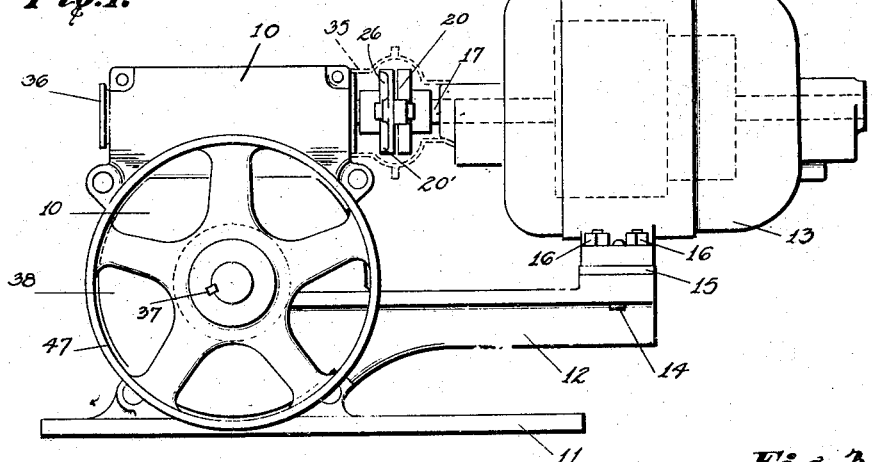
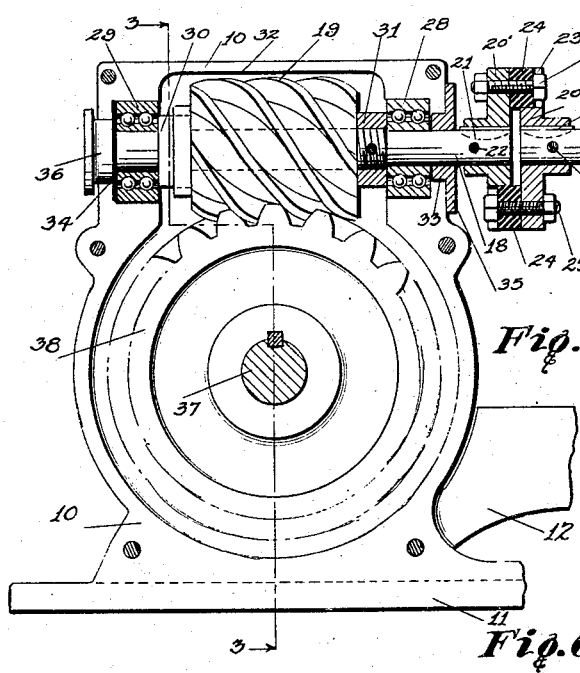
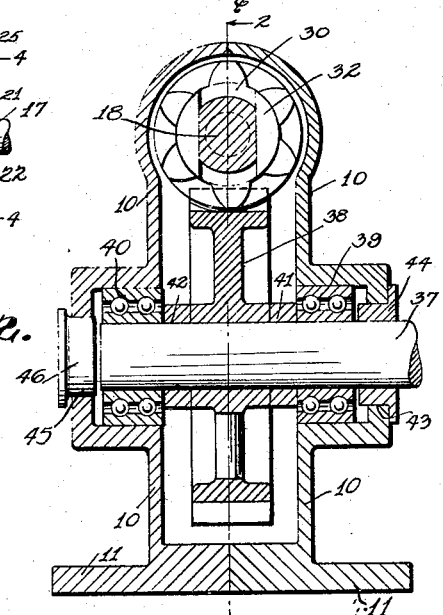
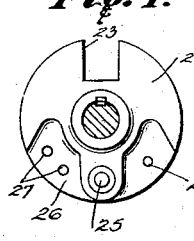
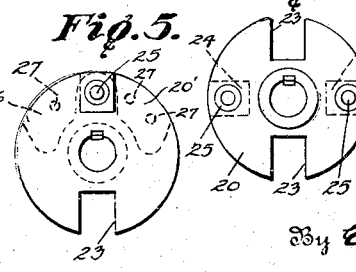
Inventor
Henry J. Schmick
By Emery, Booth, Varney & Holcombe
Attorney Patented Nov. 11, 1930

1,781,083

UNITED STATES PATENT OFFICE

HENRY J. SCHMICK, OF LOUISVILLE, KENTUCKY

POWER-DRIVING UNIT

Application filed October 5, 1929. Serial No. 397,652.

This invention relates to a power transmitting unit for increasing the effective power and efficiency of a motor operating a belt chain, or other type of drive.

The invention aims to provide a simple, compact driving unit which utilizes low loss gears for the initial speed reduction, so coupled to the motor as to minimize the usual power losses in such forms of drive. A further aim is to effect such a saving in motor and drive losses that the over all efficiency of the drive will be increased.

Other objects and advantages will appear in connection with the following description and accompanying drawings of an illustrative embodiment of the invention.

In the drawings:

Fig. 1 is a side elevation of the unit as a whole;

Fig. 2 is a longitudinal section through the same taken on line 2—2 of Fig. 3;

Fig. 3 is a transverse section through the gear assembly taken on the line 3—3 of Fig. 2;

Fig. 4 is an end view of the coupling taken on line 4—4 of Fig. 2;

Fig. 5 is a view looking in the same direction of the other coupling section to illustrate the manner of cooperation; and Figs. 6 and 7 are views similar to Figs. 4 and 5 of a pair of drive connection members of modified form.

As clearly shown in Figs. 1 and 3, the unit comprises a frame advantageously made up of two unitary castings or forgings each of which comprises one half of the gear housing 10, 10, a base flange 11, 11, and a motor supporting arm 12, 12. The motor 13, which may be of any medium speed or high speed type, is mounted upon the pair of arms 12, 12, which are connected directly to the gear housing sections 10, 10, the base of the motor being preferably secured in position on the arms by means of taper pins 14, spacers or shims 15, and stud bolts 16, or other suitable fastenings, to insure that its shaft 17 will properly align with the short shaft 18 upon which the driver 19 of the low loss reduction gear is mounted. The motor may be rigidly secured in its aligned position because of the short and direct frame connection with the gear housing which is not affected by any movement or deformation of the base flanges 11 upon which the unit is supported.

As the motor supporting faces of the arms 12, 12, are machined in jigs, it will be apparent that for each size of motor which it may be desired to incorporate in the machine to provide units of different horsepowers there will be a standard size of shim 15. Thus the proper mounting of the motor is simplified, and after it has once been properly mounted it may be readily removed and replaced in proper position because the taper pins 14 and shims 15 will automatically insure its repositioning in exactly the same location in which it was originally assembled.

Connecting the motor shaft 17 to the gear unit driving shaft 18 is a flexible coupling composed of two plate members 20, 20′, attached respectively to shafts 17 and 18 by any suitable means, such as keys 21 and taper pins 22. Each of these plates is recessed at one side, and at another point on the periphery the plate is provided with a threaded hole. The recesses 23 and the threaded holes may be of any desired number, and on each plate these elements are arranged so that when a recess of one plate is aligned with a hole of the other plate, all the other recesses and holes will be inter-related in the same fashion, and each section will be independently balanced, as hereinafter set forth.

Slidably fitting in the recesses 23 are composition fiber or rubber blocks 24 loosely pivoted on bolts 25 and securely held between the bolt heads and the plates. These bolts are screwed down until just the proper looseness of the blocks 24 is attained and are then locked in adjusted position by lock nuts. Each block 24 is of a size to be readily movable radially and axially in the complementary plate recess, to provide a loose driving connection between the two plates. The plates are each balanced dynamically by cast-in balancing recesses 26 and drilled out portions 27, so that the coupling plates will tend to rotate smoothly about the shaft axes.

The pivotal mounting of the blocks, together with the clearance between the blocks the bolt shafts and the recess, provides an efficient and slow wearing coupling, which prevents the gear end thrust from being transmitted to the motor bearings, and prevents deflection or undue wabble of either shaft in its bearings due to misalignment, strain or wear, thus reducing the loss of efficiency and slowing down the progress of wear after slight looseness of the bearings has resulted from long use. The mounting of the gear shaft comprises a thrust bearing or other means preventing the transmission of end thrust to the motor bearings, and the clearance space between the coupling plates contributes to this end, as will be obvious. The advantages of this feature in permitting free vibration of each shaft according to its own period need no detailed explanation.

The clearances above mentioned also provide for the necessary universality of the drive, which will take care of several degrees of angular misalignment and the necessary tolerance of lateral misalignment. The pivotal mounting of the blocks insures that at all times at least one block will be in flat-face contact with the wall of the recess complementary thereto; so that the driving force will be distributed over a large area and prevent wearing of the corners and deformation heretofore experienced with rigid unit-, or loose cylindrical- or spherical-, interconnecting elements, wherein the effect of line-, point-, or other enforced small area contact, has resulted in excessive wear on these members, materially shortening their life.

It is also contemplated that the coupling may be enclosed and protected by any means such as a stamped out sleeve of rigid or flexible material, as indicated in dotted lines in Fig. 1.

It will be further appreciated that when more than one block and recess are used, the clearances may be predetermined to place any desired limit on the misalignment of the shafts which the coupling will allow. Accordingly these clearances may be reduced so that wabble of the motor shaft in its bearings, after they have become somewhat worn, will be limited and damped out by the centering tendency of the coupling. Thus the progress of wear in these bearings will be materially delayed and the tendency will be to uniformly distribute what wear does occur all over the bearing surface, and to so react upon the motor shaft that it will tend to float at the bearing axis and be separated from the bearing face by a substantial film of oil; there being little tendency to squeeze out this film of oil because of the small amount of lateral thrust in the bearing.

The shaft 18 is journaled in ball-bearings 28, 29, retained between the two halves of the gear casing 10, 10, and between the bearings the low loss longitudinal cam gear 19 is centered and accurately held in place by rigidly retained collars 30, 31. Jaws 32 on the gear embrace flattened faces of the collar 30 to cause the gear and shaft to rotate in unison.

The casing 10, 10 is provided with openings 33, 34 coaxial with the shaft 18, through which grease or oil packing for lubricating the bearings may be inserted the opening 33 being closed by a flanged thimble 35, closely surrounding the shaft 16 and fitted into the opening 33, while the opening 34 is closed by a flanged plug 36, the thimble and plug serving to retain the lubricant and prevent dust from reaching the bearings 28 and 29 and other moving parts mounted within the longitudinal cam gear housing.

Arranged below the longitudinal low loss cam gear 19, with its axis at right angle to the axis of the shaft 18, is a transverse shaft 37 carrying the conjugate toothed wheel or cam gear 38, which meshes with the longitudinal cam gear 19 to be driven at a uniform speed thereby. This shaft 37 is journaled in ball bearings 39, 40, which are held respectively in recesses formed in the two halves of the gear casing 10, 10. To the shaft 37 the circumferential cam gear 38 is keyed or otherwise securely fastened. The gear 38 is centered and accurately held in place by rigidly retained collars 41 and 42. The peripheral cam surfaces of the toothed wheel 38 are engaged by the cam faces of the longitudinal cam gear 19 to rotate the shaft 37 at a uniform angular velocity ratio with little friction loss in either the contacting tooth faces or the shaft bearings.

The shaft 37 projects through a relatively large lubricant opening 43 in the base of the bearing retaining recess of one of the half-casings and carries a pulley, gear, sprocket or other driving element on its end. This opening 43 is preferably closed, to retain the oil packing and lubricant and prevent access of dust, by a flanged thimble 44, similar to the previously described flanged thimble 35. The other half casing is also provided with a lubricant opening 45 which is closed for the same purposes by a flanged plug 46, similar to the previously described flanged plug 36. In the power unit selected for illustrating the invention, a belt pulley 47 is keyed to the projecting end of the shaft 37. The belt pulley 47 advantageously may be of such diameter that its peripheral speed will be substantially equal to the peripheral speed of the size of pulley prescribed by the motor designer, or whatever size pulley is suitable for mounting on the motor shaft 17; for the direct belt drive of a given load at the desired speed.

For example, if the motor shaft 17 rotates at 1750 revolutions per minute and the driven shaft 37 rotates at 350 revolutions per minute, because of there being five times as many teeth on the toothed wheel 38 as on the cam gear 19, the pulley 47 would be five times the diameter of that specified by the motor manufacturers for the same load.

By using such a size of pulley 47, it will be apparent that the lineal speed of the belt driven from the unit will be the same as that of a belt driven directly from the pulley prescribed for the direct drive of the same load by the motor designer.

Upon comparing the characteristics and efficiency of the drive utilizing the unit, with the drive at the same lineal speed and load directly from the prescribed motor pulley, the advantages of the former are obvious.

Comparative tests of both under substantially the same conditions of motor speed and load have given the following results:

The relative speed of the driven shaft to the driving shaft was such as would be caused by gearing having a speed reduction of 3⅔ to 1. The pulley prescribed by the manufacturer for the drive direct from the ¼ H. P. motor used was of two inch diameter. The pulley used on the unit shaft 37 was of eight inch diameter. Driving the same load at the same speed, the power measured in electrical current drawn by the motor when driving through the unit was less than half that drawn by the motor when driving the load directly from the motor through the prescribed two inch pulley.

This notably greater efficiency of the unit drive may be explained as due to several factors, one of which is the superior performance of the motor when not constrained by the belt or by the gear shaft but free to assume its best running position for the particular speed and load. A second factor is the greater smoothness of operation of the gear unit when the high speed shaft is free to accommodate itself to the slight irregularities of movement due to mechanical imperfections in the gears. Another factor is the elimination of the friction loss caused by side thrust against the motor bearings because of the high belt tension necessary for driving the belt without excessive slip from the two inch pulley. Also the reduction of power loss from the slip and creep of the belt, and the increase in efficiency of the pulley to belt drive, using the eight inch pulley, as compared with the two inch pulley effects a considerable saving. In addition the reduction of power loss due to bending of the belt and the consequent saving of wear upon the belt using the eight inch pulley as compared with the two inch pulley, not only increases the efficiency of the drive by reducing the waste of power in belt flexure, but also prolongs the life of the belt.

It is evident that the invention provides a self-contained power unit of high efficiency wherein both the motor and the driving wheel, gear or pulley are rigidly and independently mounted; and in the case of a belt drive the driving pulley is adapted to the best working conditions of belt drive practice.

I do not desire to limit my invention by the specific illustrative disclosures embodied herein, but claim as my invention the following:

1. A portable reduction unit for use in combination with a source of power comprising a two-part housing having bearings for a driving shaft, a bracket integrally secured to each said housing part for supporting the source of power with its axis in alinement with the axis of said driving shaft, a driven shaft mounted in bearings in said housing parts and supporting a power take off device, mating low loss reduction gearing elements secured on said driving and driven shafts in cooperative relationship, and a flexible coupling on said driving shaft adapted to make an axially loose and angularly restrained non-rigid connection with said source of power.

2. A portable reduction unit for use in combination with a self-contained motor comprising a two-part housing, a driving shaft and power take-off gearing driven thereby mounted in bearings in said housing, a bracket integrally secured to each said housing part for supporting said motor with its axis in alinement with the axis of said driving shaft, coupling members carried by the adjacent ends of the motor shaft and driving shaft, and mating lugs and recesses on said coupling members providing a loose driving engagement between said shafts permitting slight axial and lateral movement thereof relatively to each other.

In testimony whereof, I have signed my name to this specification.

HENRY J. SCHMICK.